US012709553B2

(12) United States Patent
Katz et al.

(10) Patent No.: US 12,709,553 B2
(45) Date of Patent: Aug. 18, 2026

(54) UTILIZING ALTERNATIVE ENERGY FOR WATER PURIFICATION, WATER DISPOSAL, INDUSTRIAL HEAT, AND ELECTRICITY

(71) Applicant: Katz Water Tech, LLC, Houston, TX (US)

(72) Inventors: Gary P. Katz, Houston, TX (US); Paul L. Smith, Katy, TX (US)

(73) Assignee: Katz Water Tech, LLC, Houston, TX (US)

( * ) Notice: Subject to any disclaimer, the term of this patent is extended or adjusted under 35 U.S.C. 154(b) by 421 days.

(21) Appl. No.: 18/118,111

(22) Filed: Mar. 6, 2023

(65) Prior Publication Data

US 2023/0278891 A1 Sep. 7, 2023

Related U.S. Application Data

(60) Provisional application No. 63/317,046, filed on Mar. 6, 2022.

(51) Int. Cl.

| | |
|---|---|
| ***C02F 1/14*** | (2023.01) |
| ***C02F 1/04*** | (2023.01) |
| *C02F 103/08* | (2006.01) |

(52) U.S. Cl.

CPC ................ *C02F 1/14* (2013.01); *C02F 1/043* (2013.01); *C02F 2103/08* (2013.01); *C02F 2201/009* (2013.01); *C02F 2209/02* (2013.01); *C02F 2209/40* (2013.01); *C02F 2303/10* (2013.01)

(58) Field of Classification Search

CPC ........................................................ C02F 1/14

See application file for complete search history.

(56) References Cited

U.S. PATENT DOCUMENTS

| | | | | |
|---|---|---|---|---|
| 6,596,178 B1 * | 7/2003 | Archibald | C02F 1/04 | 122/26 |
| 2011/0023485 A1 * | 2/2011 | Schubert | C02F 1/048 | 60/648 |
| 2020/0188808 A1 * | 6/2020 | Arriola | B01D 1/0082 | |

* cited by examiner

*Primary Examiner* — Renee Robinson

(74) *Attorney, Agent, or Firm* — Gary P. Katz; Katz Law Group, LLC

(57) ABSTRACT

An apparatus, system, and method can for separating, purifying, and disposing contaminated fluids using alternative energy including geothermal, waste heat recovery, and solar energy. In one embodiment, the evaporator comprises an outer protective housing, a heat exchanger inside the outer protective housing, and a distillation column inside the heat exchanger, wherein the distillation column has at least one inlet and at least two outlets, and wherein density differences between the lighter vapor and the heavier contaminated fluids causes the lighter vapor to sperate from the heavier contaminants.

12 Claims, 10 Drawing Sheets

UTILIZING ALTERNATIVE ENERGY FOR WATER PURIFICATION, WATER DISPOSAL, INDUSTRIAL HEAT, AND ELECTRICITY

CROSS-REFERENCE TO RELATED APPLICATIONS

The present application is a United States Non-Provisional Patent Application that claims priority to U.S. Provisional Patent Application No. 63/317,046 entitled, "UTILIZING ALTERNATIVE ENERGY FOR WATER PURIFICATION, WATER DISPOSAL, INDUSTRIAL HEAT AND ELECTRICITY" which was filed on Mar. 6, 2022. U.S. Provisional Patent Application No. 63/317,046 is hereby incorporated by reference in its entirety.

FIELD

The present disclosure relates generally to systems, devices, and methods for alternative energy including geothermal energy, solar thermal, and waste heat energy. More particularly, the embodiments relate to systems, devices, and methods for using earth's sub-surface heat energy or solar thermal, and waste heat energy to dispose of water, purify water, generate electricity, and provide industrial heat energy. Most specifically, the invention relates to devices and methods to purify water using geothermal energy, solar thermal, and waste heat energy while allowing for the disposal of wastewater and the generation of electricity or heat energy for industrial use.

BACKGROUND OF THE INVENTION

Geothermal energy is an increasingly important renewable energy source that comes from reservoirs of hot water beneath the Earth's surface. Historically, geothermal energy has been used for thousands of years for cooking and heating in some countries. One definition of geothermal energy is power derived from the Earth's internal heat.

This power or thermal energy is contained in the rock and fluids beneath Earth's crust or surface. Geothermal energy can be found from the shallow ground to wells several miles below the surface, and even deeper in the extremely hot molten rock called magma.

With applications in several important economic sectors including electricity, industry, and buildings, the increased use of geothermal energy has the potential to decrease the use of fossil fuels and the resulting greenhouse gas emissions. Typically, geothermal energy involves underground reservoirs of steam and hot water being tapped to generate electricity or to heat and cool buildings directly.

A common example of geothermal energy involves a geothermal heat pump system that takes advantage of the constant temperature of approximately the upper ten feet (three meters) of the Earth's surface to heat a home in the winter. This same system can in the summer extract heat from the building and transfer it back to the relatively cooler ground in the summer. Geothermal water from the deep Earth can be used directly for heating homes and offices, or for growing plants in greenhouses. Some cities pipe geothermal hot water under roads and sidewalks to melt snow.

Typically, to produce geothermal-generated electricity, wells, sometimes a mile (1.6 kilometers) deep or more, are drilled into underground reservoirs to tap steam and very hot water that drive turbines linked to electricity generators. Abandoned or uneconomical oil and gas wells are being converted to provide geothermal energy.

Geothermal power plants are often divided into three types. The three types are dry steam, flash, and binary. Dry steam takes the steam out of underground fractures and uses it to directly drive a turbine. Flash plants place deep, high-pressure hot water into cooler and low-pressure water. The steam that results from this process is used to drive the turbine. In binary plants, hot water is passed by, to transfer heat to, a secondary fluid with a much lower boiling point than water. This heat transfer and boiling differential cause the secondary fluid to turn to vapor, which then drives a turbine.

There are numerous advantages of geothermal energy. Geothermal energy can be extracted without burning fossil fuels including coal, gas, or oil. Geothermal fields typically produce a small fraction of approximately one-sixth of the carbon dioxide that a relatively clean natural-gas-fueled power plant produces. Binary plants release essentially no emissions and are therefore carbon neutral. Geothermal energy, unlike solar and wind energy, is constantly available, 365 days a year.

Geothermal energy has some environmental concerns. The main problem is the release of hydrogen sulfide, a potentially dangerous gas that smells like a rotten egg at low concentrations. Another concern is the disposal of some geothermal fluids, which may contain low levels of toxic materials. There is a need to address these potential problems.

Clean and safe water is becoming one of the biggest problems the world is facing. According to the World Health Organization, 2.1 billion people worldwide lack access to safe water at home. Approximately 32 percent of the world's population-2.4 billion people-lack improved sanitation facilities. Accordingly, there is a need to provide clean safe water. Embodiments of this invention address the need for sustainable geothermal energy including electricity production and the need for clean and safe water for drinking, sanitation, food production, and safe wastewater disposal.

The use of solar heat as a heat source for steam turbine power generation equipment and seawater desalination equipment has been proposed. PCT Publication No. WO98/40313 proposes the combination of solar power generation and solar seawater desalination. PCT Publication No. WO98/40313 is hereby incorporated by reference in its entirety. According to PCT Publication No. WO98/40313, a medium (for example, lithium bromide aqueous solution) is heated by a solar heat collector, the heated medium is supplied to a steam turbine to generate electric power, and the medium which has emitted energy in the steam turbine is cooled by a vacuum condenser (heat exchanger) located in a seawater tank and the cooled medium is supplied again to the solar heat collector through a vacuum pump and a liquidizing device. In this technique, the medium is thus circulated to generate power and at the same time, the seawater in the seawater tank is heated through heat exchange with the medium by the vacuum condenser to evaporate and desalinate seawater.

U.S. Patent Application No. 2012/0224069 proposes using solar heat collectors to power a steam turbine engine to power a desolation plant. U.S. Patent Application No. 2012/0224069 uses steam from a steam turbine engine powered by solar thermal energy to assist in a desalination process. U.S. Patent Application No. 2012/0224069 is hereby incorporated by reference in its entirety.

The solar desalination systems proposed in the past are complex and require multiple pieces of equipment. Each piece of equipment is expensive to build and operate, making solar thermal desalination systems costly to build and operate. There is a need for a simpler system that uses less equipment and more efficiently uses solar thermal energy. The embodiments described in this application satisfy this need.

Waste energy is plentiful but not easy to utilize. There is a need to recycle waste energy simply without costly equipment to help purify water. The embodiments described in this application satisfy this need.

SUMMARY OF THE INVENTION

Embodiments of the invention generally relate to a device for evaporating, separating, and purifying contaminated water that can be powered using alternative energy including geothermal energy, solar thermal, and waste heat recovery. In one embodiment, the invention contains an outer protective housing, a heat exchanger inside the outer protective housing, a distillation column inside the heat exchanger, wherein the heat exchanger has at least one inlet and at least two outlets, and wherein density differences between the lighter vapor and the heavier contaminated fluids causes the lighter vapor to sperate from the heavier contaminants. Embodiments of the invention also generally relate to using geothermal energy from the subterranean to generate the heat required to vaporize water. More importantly, embodiments of this invention relate to using contaminated water pumped inside the geothermal well to dispose of the water and using the vapor produced by pumping the water inside the device in a geothermal well to create electricity or use the heat energy for industrial uses.

A method embodiment is disclosed. In one embodiment, the method comprises 5 steps. First, an evaporation device is inserted inside a geothermal well. Second, water flows to the evaporation device inside the geothermal well. Third, the vapor is created inside the evaporation device using heat energy from the geothermal well. Fourth, vapor flows to the surface. Finally, the vapor at that surface is used. The vapor can be used to produce electricity using a turbine and/or for industrial heat energy.

A geothermal system is disclosed. In one embodiment the geothermal system comprises: an outer protective housing, a heat exchanger inside the outer protective housing, a distillation column inside the heat exchanger, wherein the distillation column has at least one inlet and at least two outlets, and wherein density differences between the lighter vapor and the heavier contaminated fluids causes the lighter vapor to sperate from the heavier contaminants;

- a first outlet for vapor to exit the system; an outlet for the fluid remaining to exit from the system;
- at least one sensor for determining the heat energy of the vapor; and a control system for controlling the amount of water flowing into the evaporation device based on at least one sensor for determining the heat energy of the vapor. In one embodiment, the geothermal system uses geothermal energy to purify water and uses the vapor to generate electricity. The vapor can then be condensed to water. Steam and/or any excess heat energy can be used for industrial processes. In one embodiment, sensors, pumps, and controls operate the geothermal system in a coordinated manner. Additional devices, systems, and methods can use solar thermal energy or waste heat energy as energy inputs.

BRIEF DESCRIPTION OF THE DRAWINGS

The foregoing is intended to give a general idea of the invention and is not intended to fully define nor limit the invention. The invention will be more fully understood and better appreciated by reference to the following description and drawings.

DETAILED DESCRIPTION

Before describing selected embodiments of the present disclosure in detail, it is to be understood that the present invention is not limited to the embodiments described herein. The disclosure and description herein are illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, the drawings are intended to illustrate and disclose presently preferred embodiments to one of skill in the art but are not intended to be manufacturing-level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second", and so forth are made only concerning explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The liquid to be separated in this invention is generally contaminated produced water with the solids and sands removed, generally considered saltwater or brine. The embodiment, shown in FIG. 1, relates to an evaporator system 1 to evaporate and then separate pure water as vapor away from denser water containing salts which at higher concentrations is known as brine or reject wastewater.

Figure 1A:
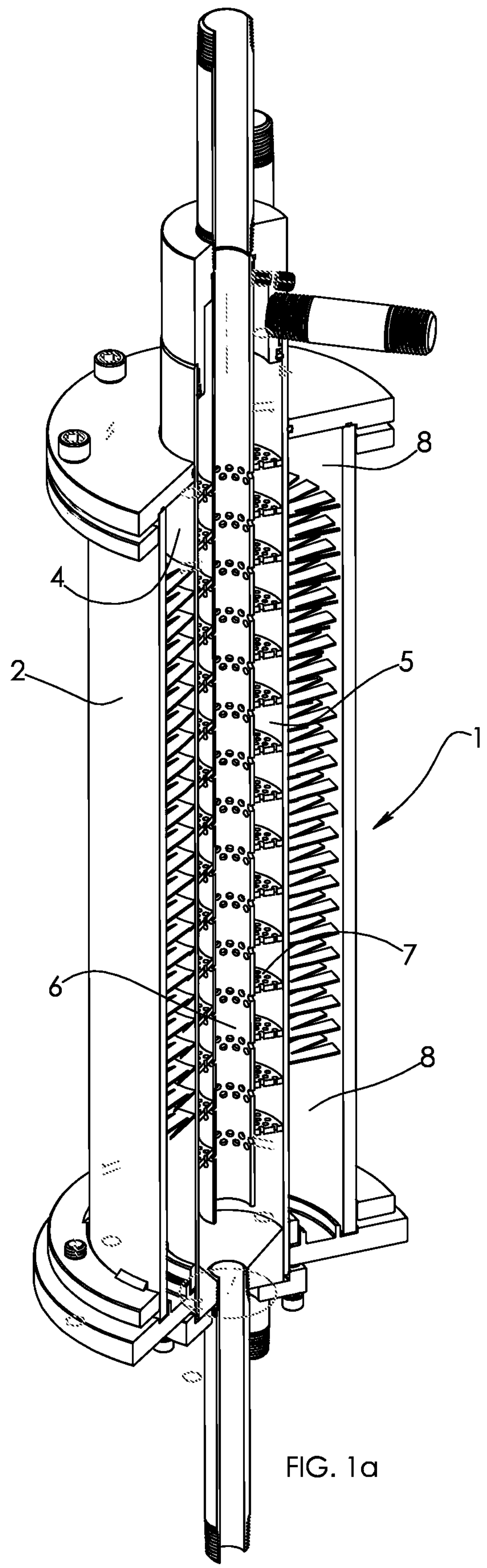
FIG. 1*a* is a detailed section view of an evaporator system.

In one embodiment, as shown in FIG. 1*a*, the evaporator 1 utilizes a commercially available finned tube heat exchanger 4 housed within an outer housing 2. The housing is preferably made from metal and even more preferably made from stainless steel. Insulation (not shown) can be added to the inside of the housing, outside of the housing, and both the inside and outside of the housing as needed. The types of insulation used can include but are not limited to ceramic insulation, paint insulation, coatings, foam, and combinations thereof. Within the inner annulus 5, or vertical run of this finned tube 4, an additional perforated evaporation column 6 is inserted along with an internal spring (not shown) that serves as a water tray or water carrier. The inner annulus 5 is fluidly isolated from the outermost annulus 8 by any appropriate method known in the art such as elastomer seals or gaskets. The internal spring is described in U.S. patent application Ser. No. 17/506,661 entitled "COILED SPRING" which was filed on Oct. 20, 2021. U.S. patent application Ser. No. 17/506,661 is hereby incorporated by reference in its entirety. Alternatively, perforated conical washers 7 can be welded to the outside of the evaporation column 6.

Figure 2:
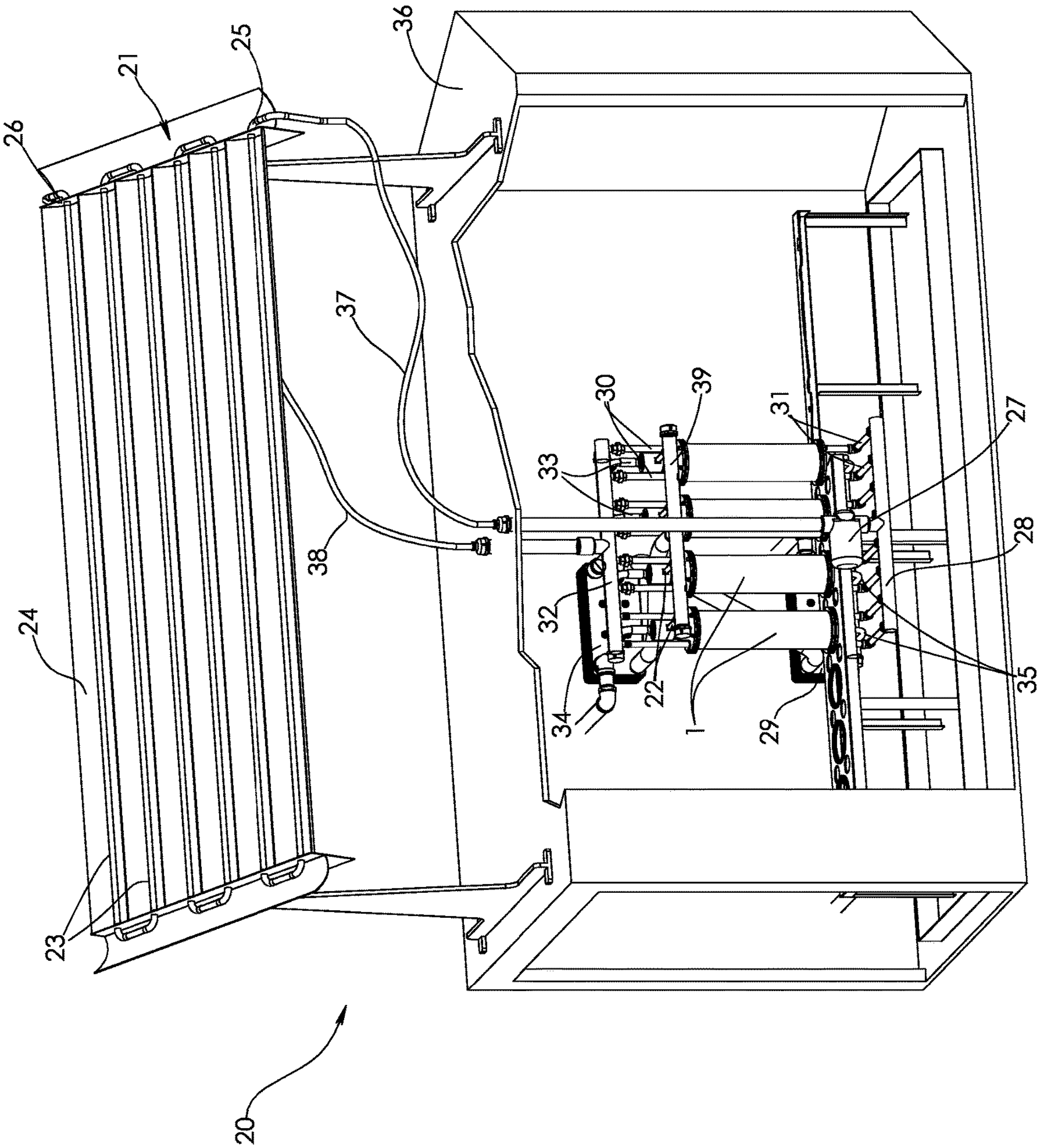
FIG. 2 is a detailed profile view of a solar evaporator system.

In one embodiment, a solar evaporator system 20 shown in FIG. 2 utilizes heat supplied by the sun to heat a thermal transfer fluid which is transferred to a heat exchanger 4 shown in FIG. 1*a* of an evaporator system 1 shown in FIG. 2. In a preferred embodiment, solar transfer fluid, such as oil, is heated by an external linear solar reflector panel system 21. These reflectors 24 focus the sun's heat radiation on conduit 23 filled with the transfer fluid. In one embodiment, several linear parabolic panel reflectors 24 could be connected in series where the fluid continues flowing from an inlet 25 of the solar panel conduit to outlet 26 of the solar panel conduit. As the transfer fluid flows from inlet 25 to outlet 26, the fluid continues to increase in temperature as it progresses through panel conduit 23. Solar panels 21 could also be connected in parallel to increase the total available volume of heat transfer fluid. Preferably, the flat panel will have a tracking device (not shown) to track the sun using one axis or two axes to capture more solar irradiance. One example of a solar panel is the XCPC solar by Artic Solar in Jacksonville, Florida.

In another preferred embodiment, the solar transfer fluid could be heated by a parabolic dish (not shown) where the sun's heat radiation is concentrated into a single focal area. The parabolic dish often referred to as concentrated solar power or "CSP" preferably tracks the sun with a two-dimensional tracker to allow the most solar energy to be reflected to the focal point. The temperature of the focal area of the parabolic dish is generally much higher than the focal point of linear solar reflectors 24. Rackam based out of Valcourt, QC, Canada sells a parabolic dish.

Figure 1B:
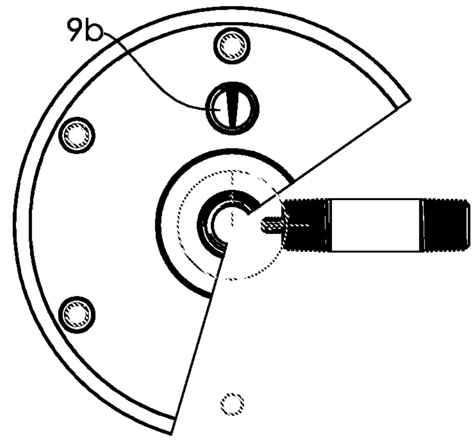
FIG. 1*b* is a top view of the evaporator system of FIG. 1*a;*

In a preferred embodiment, the solar evaporator system 20 is transported to a location via a trailer 36 but could be transported on a skid on the bed of a truck. System 20 could be unassembled and transported to a location and assembled there. In one embodiment, solar system 20 has a pump 27 to circulate thermal fluid through conduit 23 and the evaporator system 1 once heated. In a preferred embodiment, solar system 20 has externally located heat exchangers 29 and 34 to recapture the heat energy exiting system 1 namely the unevaporated processed water called brine and the evaporated steam to preheat the produced water entering system 20. In one embodiment, solar system 20 has more than one evaporator 1 connected in parallel. Heated thermal transfer fluid exits the solar panels 21 at outlet 26 and travels through supply conduit 38 into supply manifold 32. Supply manifold 32 has outlets 30 that could supply each evaporator 1 with heated thermal transfer fluid at opening 9*a* as shown in FIG. 1*b*. In another embodiment, there could be more than one supply manifold in the solar system 20. In another embodiment, the cooled thermal transfer fluid exits evaporator 1 at opening 9*b* shown in FIG. 1*c* to enter return manifold 28 by exit conduits 31 as shown in FIG. 2. In one embodiment, return manifold 28 could accept the transfer fluid exiting all evaporators in the solar system 20 or in another embodiment there could be multiple return manifolds. The cooled thermal transfer fluid exits the supply manifold and is pumped back through return conduit 37 by the circulation pump 27.

In a preferred embodiment, the produced water enters the solar evaporator system 20 shown in FIG. 2 and is preheated by pre-warmer heat exchangers 29 and 34 using waste heat energy from the steam evaporate and unevaporated brine. The pre-heated produced water enters a produced water manifold 39. Manifold 39 has outlet 22 which supplies one or more evaporators 1 with water to be processed and enters the innermost annulus 5 as shown in FIG. 1*a*. In a preferred embodiment the solar system has one manifold 39 but system 20 could have multiple produced water supply manifolds 39. Evaporate exits the evaporator system 1 at steam outlet 33 and enters an evaporate manifold not shown. In a preferred embodiment, there is one evaporate manifold for the solar system 20 but there could be multiple evaporate manifolds. In one embodiment, the evaporate is passes into a heat exchanger 34, which can be a plate heat exchanger or a shell and tube heat exchanger to recover the heat energy to preheat the produced water entering the evaporator 1. In another embodiment, the solar system 20 could have a condensing coil (not shown) to cool the evaporate back into the liquid phase.

In one embodiment, some of the produced water that is not evaporated is called brine reject discharge water and exits the evaporator at outlet 35 as shown in FIG. 2. This unevaporated brine could be circulated through a heat recovery evaporator to transfer the heat energy to the produced water coming into system 20.

Figure 1C:
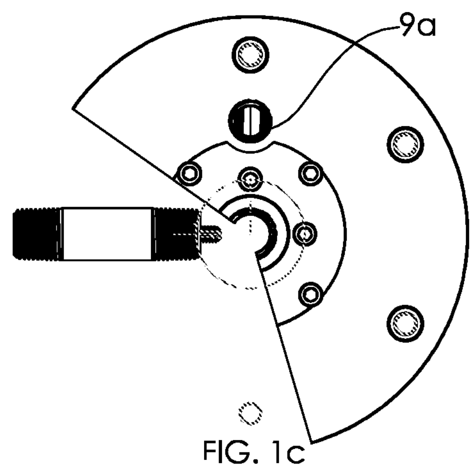
FIG. 1*c* is a bottom view of the evaporator system of FIG. 1*a;*

The solar heat transfer fluid, which is preferably an environmentally friendly mineral oil, in a preferred embodiment enters through opening 9*b* as shown in FIG. 1*b* at the top of the outermost annulus 8. In another embodiment, the thermal transfer fluid could enter evaporator 1 at the bottom through opening 9*a* as shown in FIG. 1*c*, which is the outermost annulus 8. The heated fluid is circulated through the outer annulus 8 while it transfers energy via these fins to the inner evaporation column 6, which is in the innermost annulus 5 where evaporation and separation occur. The fluid cools during the heat transfer and exits system 1 towards the top through opening 9*a*. The exited fluid is pumped back through solar panels 21 as shown in FIG. 2 to be reheated by solar energy. Additional heat transfer fluid materials include but are not limited to synthetic oils, glycol, water, steam, air, nitrogen, molten salt, and combinations thereof.

Figure 3:
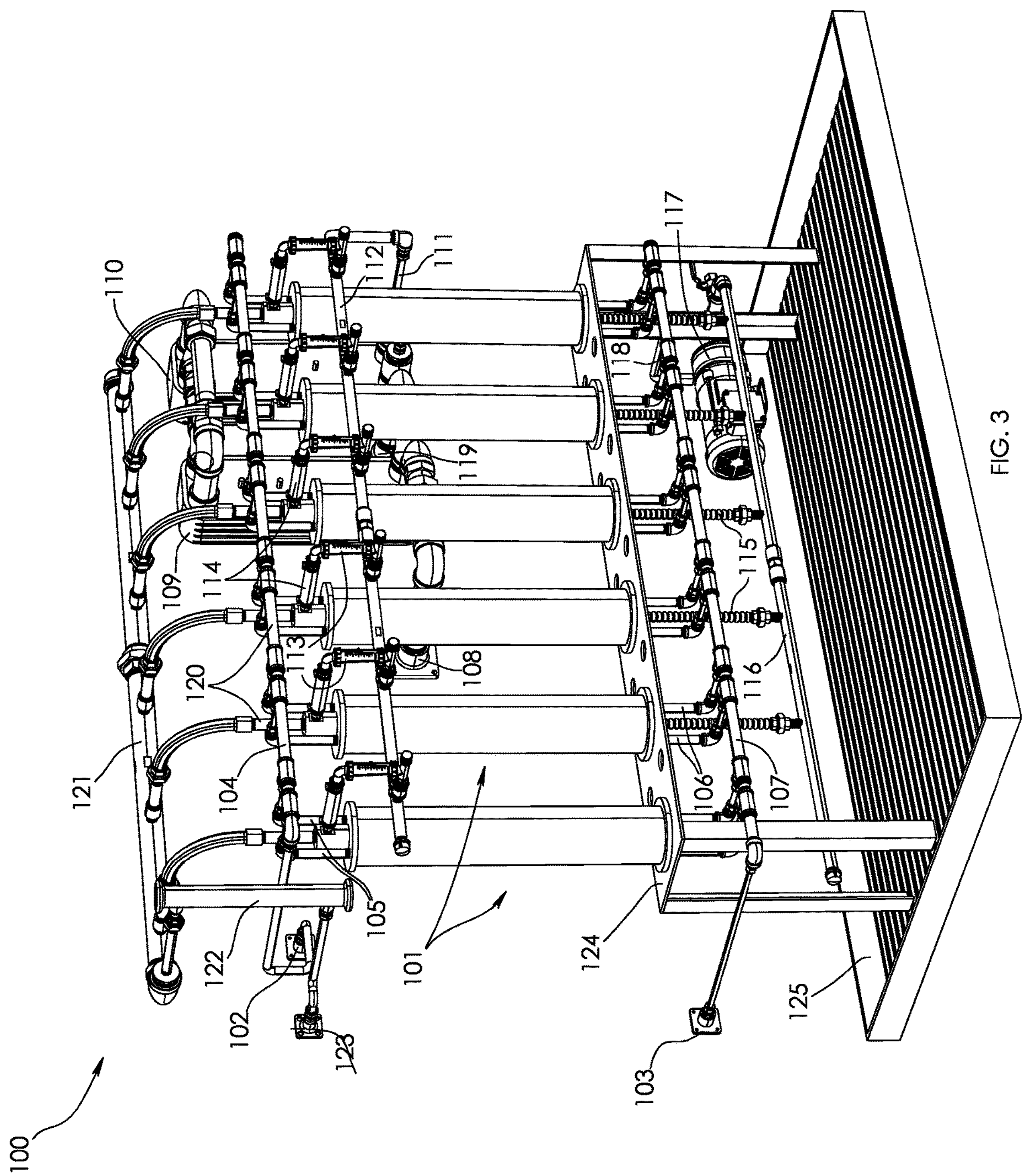
FIG. 3 shows a detailed profile of a skid system that uses alternative heat energy.

FIG. 3 shows a more detailed perspective of one embodiment of a skid system 100 used for solar-powered evaporation comprising a bank of individual evaporators 101 connected in parallel. The skid system is shown in FIG. 3 for solar-powered evaporation could also be adapted to be used for geothermal fluid-heated evaporation or any other alternative heat energy source including solar thermal and waste heat recovery. The solar skid system 100 has a thermal fluid inlet 102 and an outlet 103. Heated thermal transfer fluid heated from solar panels or other alternative sources enters the skid system at inlet 102 into supply fluid manifold 104. Connected to manifold 104 is a plurality of conduits 105 that connect manifold 104 to the top of the evaporator 101. In a preferred embodiment, a plurality of conduits 105 can connect each evaporator to the manifold 104. However, in an alternative embodiment, there may be only a single conduit connecting each evaporator 101 to the manifold 104.

The hot thermal transfer fluid flows out of manifold 104 through conduit 105 into the top of the evaporators 101 into the outermost annulus 8 shown in FIG. 1a. As the transfer fluid flows past the heat exchanger 4 inside evaporator 1 shown in FIG. 1*a*, it can exit evaporator 101 as shown in FIG. 3 into conduits 106. Conduits 106 connect the evaporators 101 with a fluid outlet manifold 107. In a preferred embodiment, there is a plurality of conduits 106 connecting each evaporator 101 with the outlet manifold 107. In an alternative embodiment, only a single conduit could connect the evaporator 101 to the manifold 107. The fluid flows out of the evaporator 101 into conduits 106 into manifold 107 and out of the solar skid 100 at outlet 103.

Also shown in FIG. 3 is contaminated fluid inlet 108. The contaminated fluids can be brackish water, salt water, industrial wastewater, agricultural wastewater, or geothermal water. Contaminated fluid to be processed by the evaporators 101 enters the skid system 100. In a preferred embodiment, the fluid entering the skid 100 through 108 passes through at least one heat exchanger pre-warmer 109 to recapture the heat energy of the heated fluid exiting evaporator 101. In a preferred embodiment, the skid may have a plurality of pre-warmer heat exchangers as shown in FIG. 3 as 109 and 110. As shown in FIG. 3, conduit 110 connects the pre-warmers 110 and 109 connected in series in a preferred embodiment to contaminated fluid supply manifold 112.

As the fluid enters manifold 112 from conduit 111 it passes through flow meters 113 shown in FIG. 3 that are adapted to regulate the rate of contaminated fluid entering the evaporators 101. In a preferred embodiment, the flow meter 113 not only regulates the flow rate but can register a flow rate value. As the fluid enters the evaporator 101 after flowing through the regulator meters 113 it passes into the innermost annulus 5 as shown in FIG. 1*a*. A portion of the contaminated fluid is not evaporated by evaporator 101, known as brine, exits evaporator 101 into outlet conduit 115 as shown in FIG. 3. Outlet manifold 116 is connected to evaporators 101 by conduit 115. The skid system 100 has a pump 117 that connects to the manifold 116 and a conduit 118 that connects pump 117 to the pre-warmer heat exchanger 110. The brine is hot, and the wasted heat of the almost evaporated brine fluid is exchanged into the cooler contaminated water coming into system 100 at inlet 108. After heat is removed from the brine it exits system 100 at outlet 119. The pre-warmer heat exchanger 110 serves as an energy recapture device by transferring the heat energy to the feedstock entering the system.

Also shown in FIG. 3 is evaporate outlet conduit 120. A portion of the contaminated fluid entering the evaporator 101 is evaporated and exits through conduit 120 into evaporate manifold 121. In a preferred embodiment, the heat exiting the evaporator by the evaporator could be recaptured by a heat exchanger (not shown) or a condenser with heat recovery to create a heat recovery system to recover or recycle the energy. Evaporate manifold 121 is connected to a heat exchanger 122 to condense the vapor back to liquid as a purified fluid. There are many embodiments of a condensing system (not shown) or heat exchanger system (not shown) that could be used as an alternative as these systems are known to persons skilled in the art. The condensed evaporate exits the skid system at outlet 123.

Also shown in FIG. 3 is table 124 which may support the evaporators 101, manifolds 107,116,104, and 121 as well as the pre-warmers 109, 110, or any other components needed for the skid system 100. The skid system 100 also may have a secondary containment 125 that could temporarily capture any accidental spills that may occur within the system 100.

For the natural gas version, a burner (not shown) combusts gas. The flue gas from the gas combustion provides the heat energy source for heat exchangers 101. In one embodiment, waste gas is utilized. The waste gas can be recovered from flare gas from an industrial plant. Alternatively, an oil well or a landfill can provide a waste gas source. In one embodiment, flare gas recovered at a garbage dump or landfill site can be used to purify landfill leachate water onsite.

Waste heat or waste heat gas often called flue gas can be used to power the heat exchangers 101. The waste heat can come from industrial processes such as refining or smelting or can come from devices such as the exhaust or waste flue gas from a generator. In one embodiment, the exhaust system of a generator (not shown) would be directly connected to line 107. After heat exchanger 101 transfers the heat energy from the waste exhaust, the waste exhaust would travel through line 104 to a discharge point (not shown). Alternatively, the waste exhaust can be reinjected into a nearby wellbore to create a carbon capture and sequestration (CCS) system.

Figure 4:
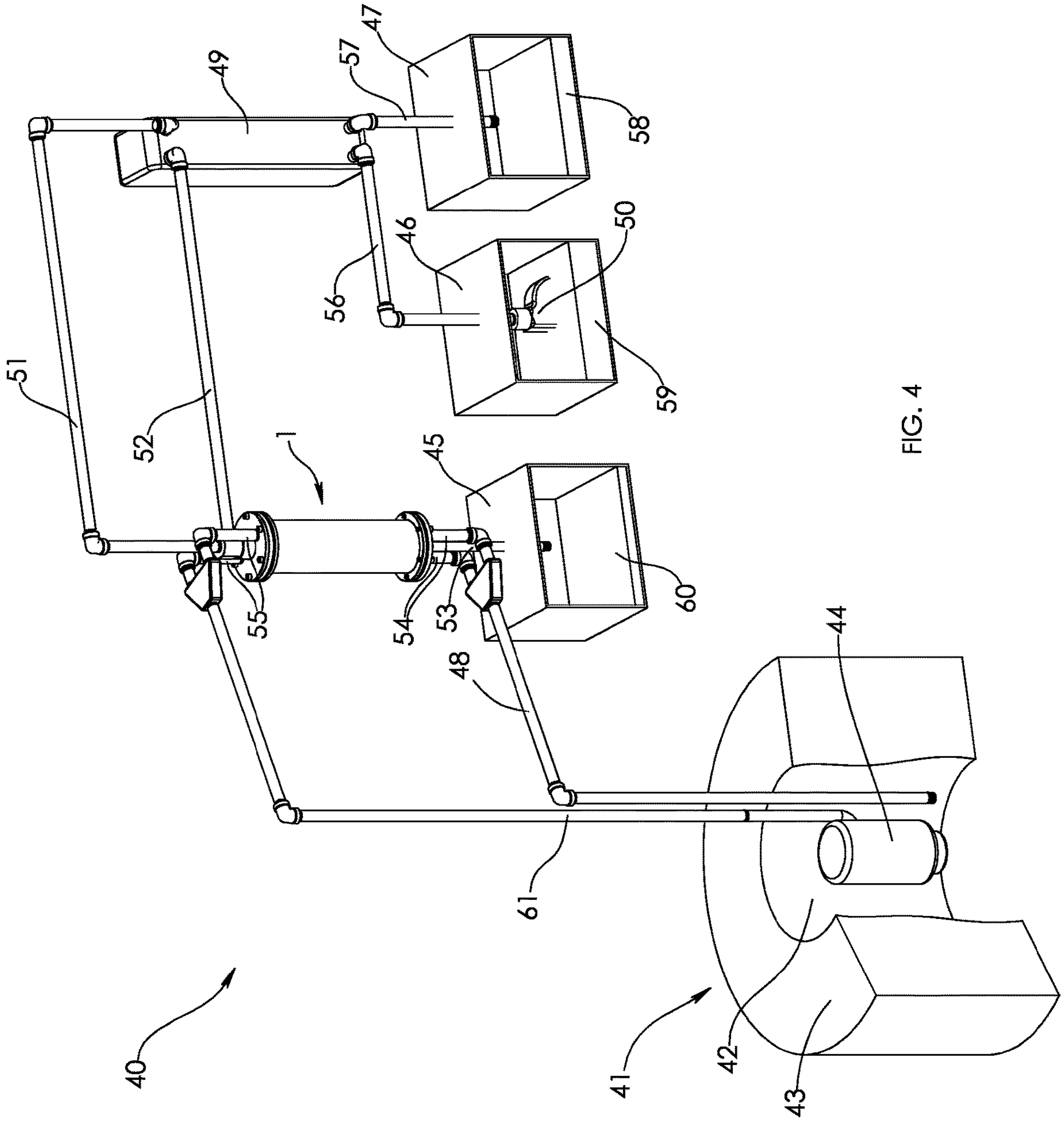
FIG. 4 is a detailed view of a geothermal evaporator system at the surface of a geothermal well.

In another embodiment shown in FIG. 4, hot geothermal fluid is used for a surface geothermal evaporator system 40 having an evaporator system 1 as shown in FIG. 1*a* and FIG. 4. Downhole inside the geothermal wellbore 42 of well 41, a pump 44 circulates hot geothermal well fluid through supply conduit 61 up to the evaporator 1. The hot geothermal fluid enters the evaporator through conduits 55 through openings 9*b* and into the outer annulus 8 of the evaporator 1 as shown in FIG. 1*a*. As heat is transferred from the hot geothermal fluid to the heat exchanger finned tube 4 the fluid loses temperature. The cooled fluid exits the evaporator system 1 through openings 9*a* and into conduits 54 and into return conduit 48 to be reinjected into the wellbore 42 as shown in FIG. 3. In an alternative embodiment, the hot geothermal fluid could enter the evaporator system 1 at the bottom from the supply conduit 61 through openings 9*a* and exits the evaporator system 1 at the top through openings 9*b* to return conduit 48.

The evaporation takes place inside the inner annulus 5 of the evaporator system 1 as described above and shown in FIG. 1*a*. In one embodiment, produced water 59 is circulated to the evaporator system 1 from a produced water supply 46 by pump 50 as shown in FIG. 4. In a preferred embodiment, the produced water is preheated by the heat exchanger 49 with the hot evaporate exiting the system 1 as described above. In an alternative embodiment (not shown), the produced water supplied to evaporator system 1 could be further preheated by a second heat exchanger using the hot brine 60 after the hot brine exits evaporator 1. In one embodiment, the unevaporated produced water exits the evaporator system at the bottom through conduit 53 and into brine storage 45. In a preferred embodiment, the hot brine 60 could be circulated through a prewarming heat exchanger (not shown) before it flows into brine storage 45. The brine could be further processed to remove valuable materials or minerals or sent downhole into the geothermal well for disposal.

Figure 5A:
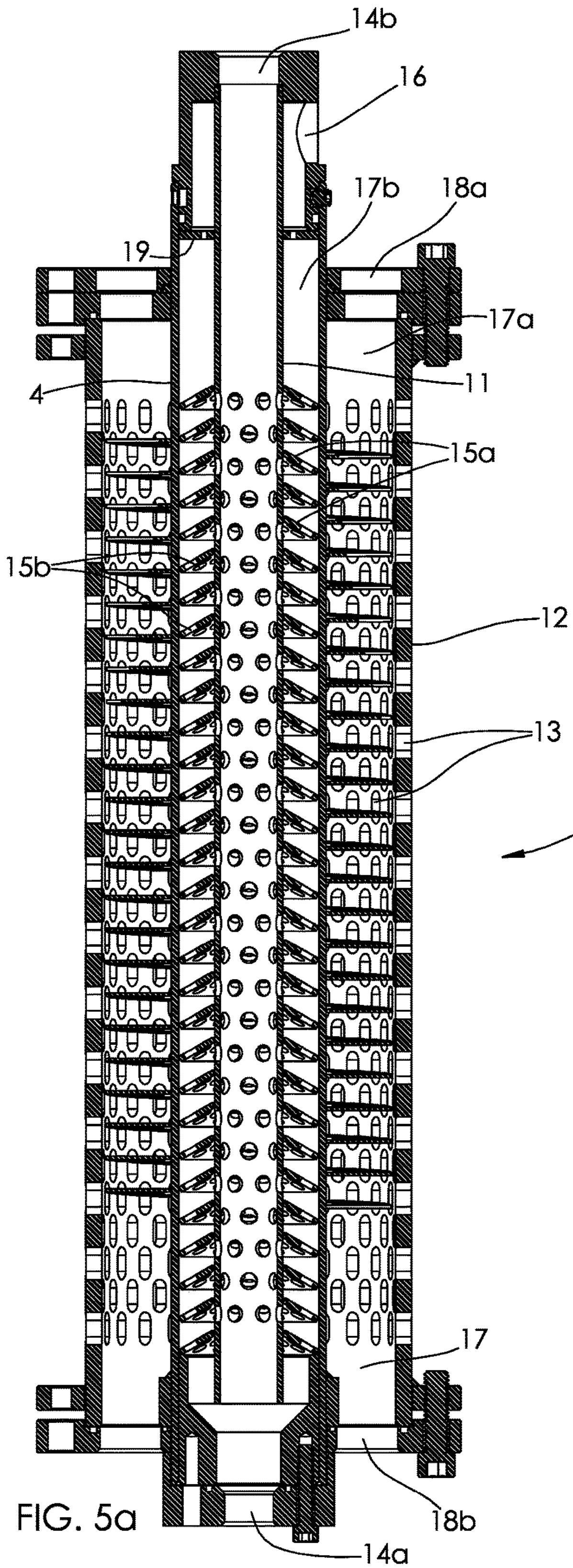
FIG. 5*a* is a detailed section view of an evaporator system for utility down in a geothermal well.
Figure 5B:
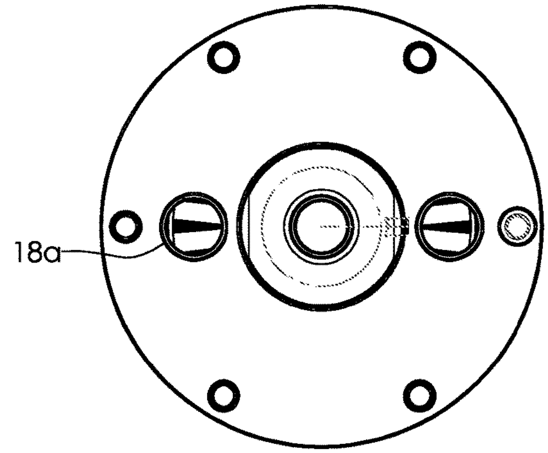
FIG. 5*b* is a top view of the evaporator of FIG. 5*a;*
Figure 5C:
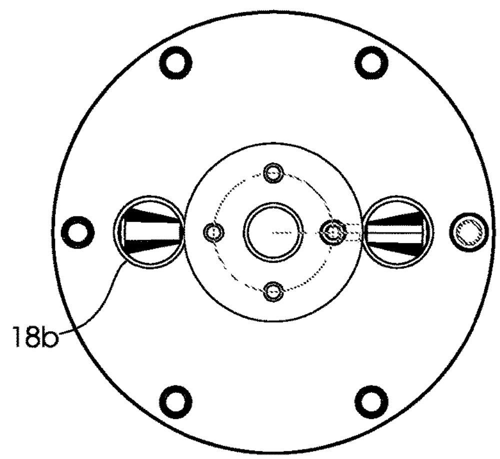
FIG. 5*c* is a bottom view of the evaporator of FIG. 5*a;*

An alternative embodiment using natural heat evaporation is shown in FIG. 5*a*, FIG. 5*b*, and FIG. 5*c*, are similar to FIG. 1*a*, FIG. 2*b*, and FIG. 3*c* respectively. The downhole geothermal system 10 is nearly identical to the solar evaporator system 20 surface geothermal evaporator system 40, with the following changes. The outer housing 12 has at least two apertures 13 or a plurality of apertures 13 in the outer housing 12. This allows the geothermal well fluid to enter the outer housing 12 into an outermost annulus 17*a* to provide the heat energy to power the downhole heat exchanger system 10. The apertures 13 or perforations must be large and numerous enough to allow sufficient fluid flow to rapidly heat the heat exchanger 4 middle annulus and transfer enough new fluid to prevent the temperature of the fluid inside the outer housing 12 to drop to an unacceptable value due to the heat transfer of the heat from the well fluid to the heat exchanger 4. Apertures 13 must be small enough not to allow large solid particles or foreign objects to enter annuls 17*a* inside the outer housing 12. The apertures 13 may be holes and should be at least 2 millimeters in diameter but no larger than 20 millimeters, more preferably the holes should be at least 3 millimeters in diameter and less than 15 millimeters in diameter, and most preferably the holes should be at least 4 millimeters in diameter and less than 10 millimeters in diameter. The apertures 13 may be formed by machining, perforating, or cutting or may be cast if the outer housing 12 is a molded casting. The apertures 13 could be round holes or slots or any shape conducive to fluid flow. Alternatively, the outer housing 12 can be a fine mesh screen or a series of rods arranged in a circular pattern or cylinder to form a screen-like outer circumference. The screen hole diameter size or rod spacing should be at least 2 millimeters but no larger than 20 millimeters, more preferably the distance should be at least 3 millimeters and less than 15 millimeters, and most preferably the distance should be at least 4 millimeters, and less than 10 millimeters.

In an alternative embodiment, geothermal well fluid could be forced into the outer annulus 17*a* through an opening 18*a* towards the top end of the system 10 by pumping or another method to assist in the displacement and circulation of the geothermal fluid that enters through apertures 13. There could be one or multiple openings 18*a*. In a preferred embodiment, there would be two or more openings 18*a* or a number sufficient to displace cooled fluid around the entire circumference of the annulus 17*a* with hotter fluid from outside the outer housing 12. This forced fluid enters annulus 17*a* at the lower end of system 1 through one or multiple openings 18*b*. The displacement fluid could be pulsed instead of a continuous flow. In another embodiment, geothermal well fluid could also be pumped into annuls 17*a* through openings 18*a* and 18*b* at the same time. The displacement fluid entering through openings 18*a* or 18*b* could also provide a flushing option for any debris lodged around the fins or blocking the apertures 13. As the geothermal well fluid proximal to the heat exchanger 4 and inside the annulus 17*a* loses temperature by the transmittal of heat, circulation of the surrounding wellbore fluid is needed to displace the cooled fluid with hotter fluid from the geothermal well. If the natural fluid movement inside the annulus 17*a* is not sufficient, artificial fluid flow can be induced by pumping fluid through openings 18*a* or 18*b* to displace the cooled fluid.

Saltwater or contaminated source water enters system 10 through inlet 16 and flows to an orifice plate 19 at the top of the innermost annulus 10*b* and flows down the outside of the evaporation column 11. The outermost annulus 17*a* and innermost annulus 17*b* are fluidly isolated and can be isolated by any sealing method known by persons skilled in the art. Through the combined effects of surface tension and differences in density, the alternate flow paths provided by the perforated column 11 and conical washers 15*a* in the middle annulus result in the separation of heavy brine from the pure distillate. The small, perforated holes 15*b* in conical washers 15*a* are designed to improve vaporization or evaporate efficiencies and rates by maximizing the water droplet surface area. The brine flows out the bottom opening 14*a* of the tube while the evaporate exits through the top 15 of the innermost column inside the evaporator.

The distillate then passes through an externally mounted plate/frame heat exchanger (not shown) which serves the dual purpose of condensing the water vapor and recapturing the vapor's heat energy, which is reused to heat the source water, decreasing the amount of external energy required to reach evaporation temperature. Limited residence time, stainless steel construction, and a gravity flow design eliminate standing water within the X-VAP™ thermal desalination device or system to prevent scaling.

Embodiments of the X-VAP™ thermal distillation system are described in U.S. Pat. Nos. and 9,783,431 and 10,864,482. U.S. Pat. No. 9,783,431 is hereby incorporated by reference in its entirety. U.S. Pat. No. 10,864,482 is hereby incorporated by reference in its entirety.

This embodiment can be useful for contaminated water that is produced at hydrocarbon well sites after solid contaminants have been removed but can be used with other applications such as industrial wastewater and seawater desalination. The solids are typically removed by filtering including cartridge filters and gravity media filters using water handling equipment which includes equipment for processing, transporting, and storing water at the hydrocarbon-producing well sites. The hydrocarbon well sites can be oil or gas wells whether they be an onshore well site or an offshore well site. The invention separates a liquid by heating it to increase the evaporation rate, separating the vapor and then collecting the unevaporated liquid, collecting the vapor, condensing the vapor, and collecting the condensate. More specifically, in one embodiment, this invention heats contaminated water such as preheated or prewarmed salt brine to increase the evaporation rate.

The evaporation rates are close to or at the boiling temperature or to a temperature high enough to produce condensable vapor out of the brine. The temperature can be reduced by placing the evaporators at pressures less than atmospheric. This can be accomplished using mechanical compression or vacuum pumps. Preferably the pressure should be at least less than 0.9 bar, more preferably, less than 0.7 bar, and most preferably less than 0.5 bar. The pressure should not be reduced significantly more than 0.5 bar and most preferably should not be less than. 1 bar to avoid a near-vacuum situation that may cause issues such as container collapse. The vacuum pumps will likely need to be outside wellbore 67 on surface 66 with lines running to the surface to create the vacuum suction.

In one embodiment, a venturi is attached to the brine pump. The venturi device (not shown) is further connected to the inside of the heat exchanger and preferably directly to the middle annulus. The suction from the brine pump creates vacuum suction through the line connecting the venturi to the inside of the heat exchanger. One-way valves can be placed at the outlets of the heat exchanger to prevent any air from entering. The inlet can be sized to allow enough water and minimize any additional air flowing into the heat exchanger. The size of the venturi and the pump pressure can be calculated or adjusted to create a vacuum. The vacuum suction for the venturi must be sufficient to create a vacuum or at least larger than the amount of air entering the inside of the heat exchanger. The vacuum pressure created cannot be created than the crush pressure of the inside of the heat exchanger. The crush pressure can be calculated by the material type, wall thickness, and support or can be calculated by doing stress simulations using modeling programs such as COMSOL, ANSYS, or SolidWorks Simulation.

In one embodiment, alternative flow paths allow the lighter vapor to separate from the heavier solids using gravity and the density differences between the components. Without alternative or multiple flow paths the vapor energy can carry solid contaminates in a physical property known as entrainment. Therefore, a closed loop system will not allow effective and consistent separation of the vapor from contaminates that occurs in an open system with alternative flow paths or multiple flow paths. Very often, in a closed loop system, the water contaminants quickly dissolve back in the water as it is condensed because there is no separation. This typically happens in traditional heat exchangers and boiler systems.

Another method to increase evaporation rates is to increase surface area. The greater the surface area of the water or fluid the quicker the water or fluid can evaporate. The surface area can be increased by creating water droplets. One method is to spray the fluid onto the heat exchanger using a nozzle, atomizer, or aerator. This can be accomplished by forcing water through a fine mesh under pressure. Gas, such as air under pressure can often be used to help atomize water or fluid. Another embodiment is to engineer a plurality of holes to cause water droplets during natural gravity flow. The larger the surface area the easier the water droplets can vaporize. In a preferred embodiment pressure including pressurized air can be used to create small colloidal particles.

After evaporation or vaporization, the vapor is typically separated from the brine. The evaporated vapor stream and the unevaporated brine are then separately collected. The separation should preferably occur quickly and inside the evaporator to reduce complexity and prevent the vapor from carrying a significant amount of salt. The property of having the vapor carry contaminates including salt particles is known as entrainment. Entrainment can be reduced by using a fine mesh also known as a demister or by adding one or more internal baffles inside the evaporator or on the vapor line. The demister or baffles create a physical barrier that is easy for the vapor to pass through and difficult for the entrainment particles.

The invention can be used to separate purified water from brine water by using the evaporation process. Purified water generally contains little or no salts. The water should preferably contain less than 2,000 parts per million (PPM) of total dissolved solids (TDS), even more preferably less than 1,000 PPM of TDS, and most preferably less than 500 PPM of TDS. As discussed above, vapor, in a property known as entrainment, can have enough energy to carry some salts in the molecules. Using internal baffles or complex geometries or multiple flow paths can help reduce the vapor energy enough to stop carrying solids and allow gravity to naturally separate the contaminates due to density differences. It may be necessary to filter the vapor using a mechanical filter such as a demister, or membrane to remove the salts. Alternatively, the process can be repeated multiple times to remove any entrained solids or salts.

Figure 6:
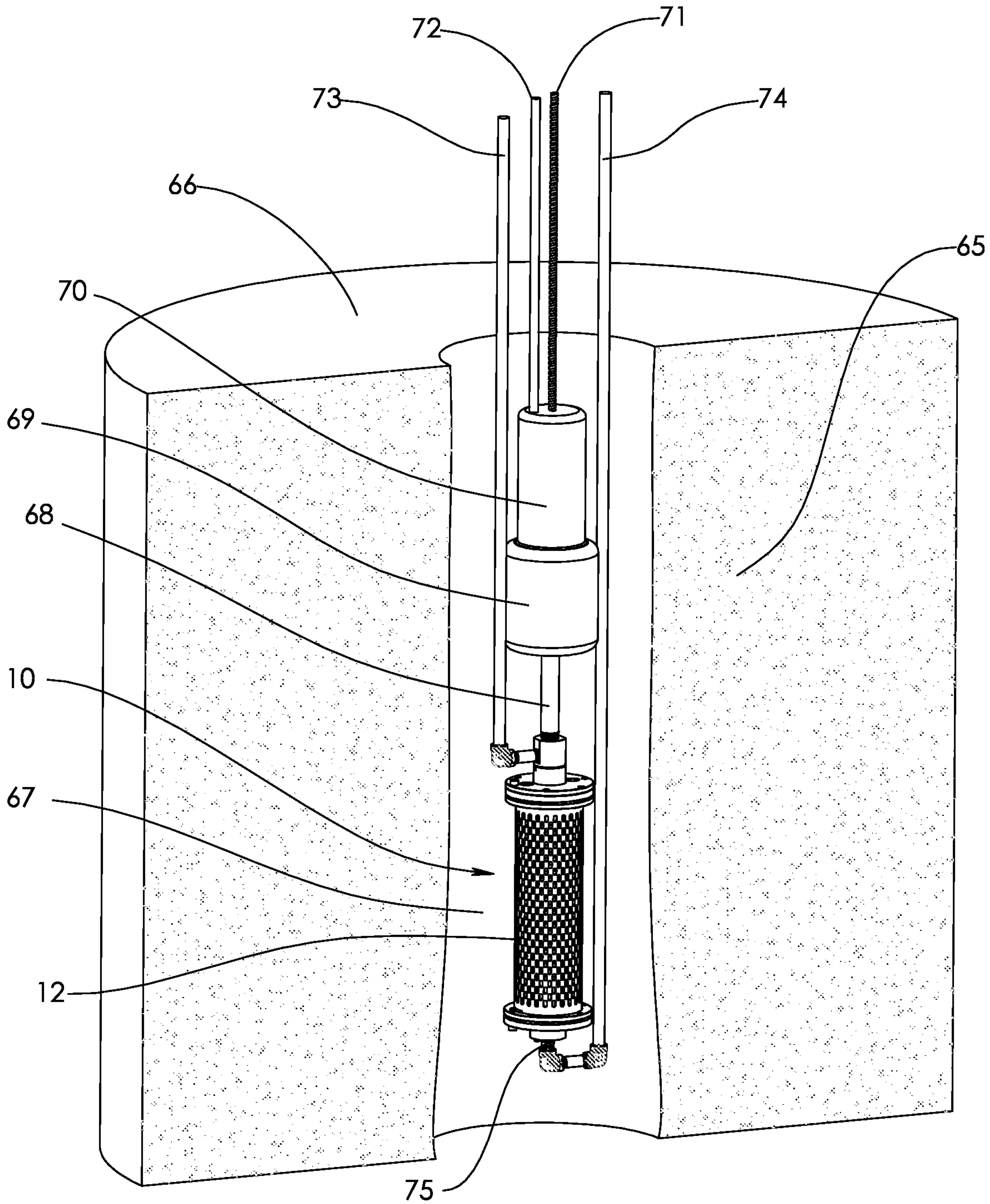
FIG. 6 is a profile view of an evaporator system in a downhole geothermal system application.

Embodiments of the X-VAP heat exchanger technology can work inside a geothermal wellbore 67 and directly provide steam for power or steam for condensation for freshwater, as shown in FIG. 6. A preferred modification to heat exchanger 4 will include changing the carbon steel fins and pipes into aluminum and aluminum alloys including titanium-aluminum (to improve thermal conductivity). As discussed above, the outer housing 12 with apertures 13 provided into it will form a protective screen to prevent damage from the wellbore casing, objects, and debris in the wellbore while allowing the free flow of hot geothermal fluids found naturally in the wellbore 67. The heat exchanger system 10 will be inserted using a heavy-duty metal cable 71 and be connected to surface 66 with flexible heavy-duty conduits 73,74 to bring wastewater from surface 66 and return purified vapor to the surface. In another embodiment, power could be brought to surface 66 via an electrical cable 72.

Concentrated brine will be outputted into the wellbore 67 utilizing one-way flow devices including poppet valves or check valves (not shown) to prevent wellbore fluid contamination inside the heat exchanger. The brine can be deposited into the wellbore 67. Alternatively, the brine outlet pipe 74 can bring the brine to surface 66, if needed. Bringing the brine to surface 66 will enable the selective removal of valuable metals found in geothermal wells such as lithium and rare earth elements. The purified vapor can be used to power an attached generator 70 inside the wellbore 67 with a power line 72 to the surface 66 or the purified vapor can be sent to the surface 66 for power steam generation and/or condensation to purified water depending on the needs of the end-user customer.

The steam at the surface 66 can then power a steam turbine or a Rankine steam cycle or a Sterling engine. Additional uses of steam include using steam to provide heat energy for industrial uses. A preferred embodiment involves using steam to generate electricity and then using the remaining heat energy from the steam to provide industrial use. Since the vapor or steam has high water purity, once condensed, the water from the vapor or steam can be used as fresh water after condensation. The use of this water includes municipal, industrial, agricultural uses, and combinations thereof.

Another embodiment is the generated electricity downhole. This would involve placing the steam turbine 69 or ranking cycle engine or sterling engine downhole directly above the geothermal distillation system 10. Water flowed through the heat exchanger 4 would then vaporize to provide the power for the steam turbine or ranking cycle engine or sterling engine to generate electricity in the generator 70. The water can be from water pumped from the surface or water flowing from the geothermal well. The power can the brought to surface 66 via an electrical cable 72 attached to the generator 70 and steam turbine 69 or ranking cycle engine or sterling engine generating the electricity. The vapor water could also be flowed or pumped to the surface 66. This embodiment would require fewer lines from the geothermal distillation system to the steam turbine or ranking cycle engine or sterling engine generating electricity.

As shown in FIG. 3 a skid 100 can hold a group of X-VAP thermal distillation systems 101. This system 100 would take the hot geothermal water directly from the well and use the heat energy to vaporize or distill water. The water could then be used to run turbines not shown or provide industrial heat or could be used to generate electricity at the surface and the excess heat could then power industrial uses.

Figure 7:
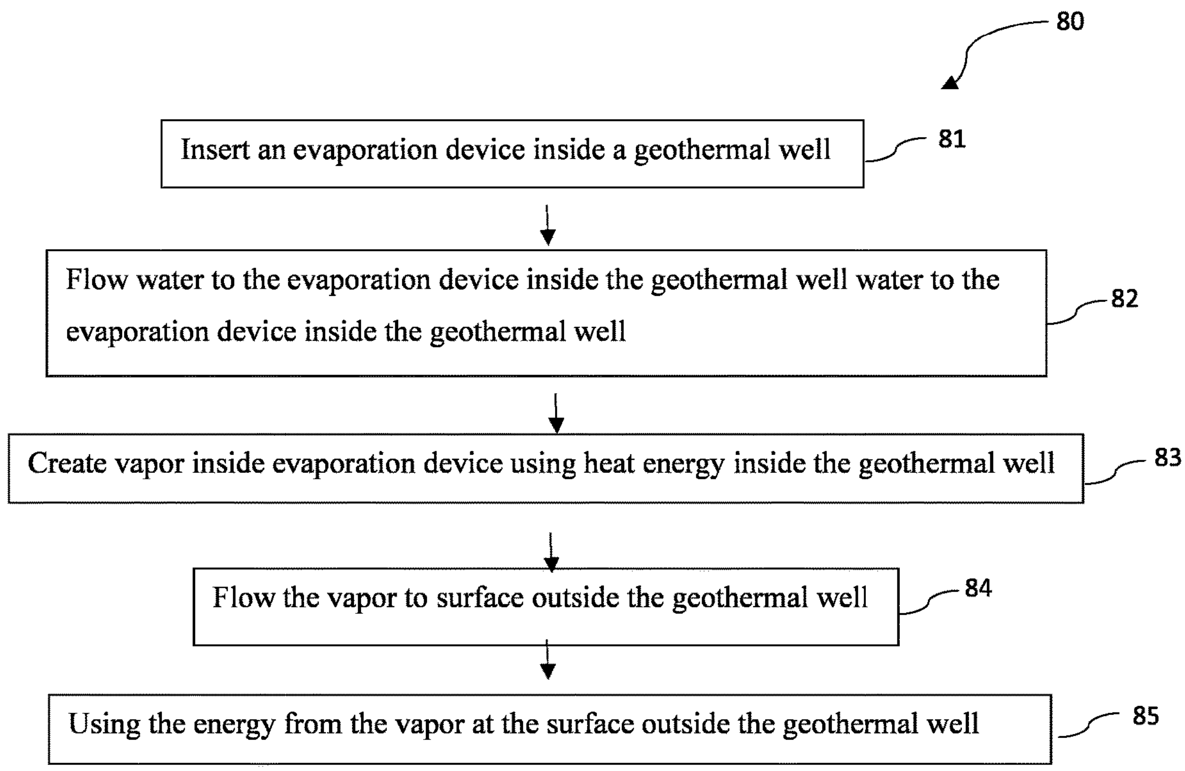
FIG. 7 is a flow chart of a method embodiment.

Methods:

As shown in FIG. 7, In one embodiment, the method involves 5 steps 80. First, an evaporation device is obtained and then inserted inside a geothermal well 81. The evaporation device can be lowered into a geothermal well by a wireline truck. Preferably the wireline should be detachable so the equipment can be left at the well site without the requirement of the truck being present. Second, water flows to the evaporation device inside the geothermal well 82. As discussed above, the water can be pumped from the surface or can come from the geothermal well. Third, vapor inside the evaporation device is created using heat energy from the geothermal well 83. Fourth, the vapor flows to the surface outside the geothermal well 84. Alternatively, the vapor can flow to an energy device downhole or inside the wellbore. Fifth, the vapor is used at the surface outside the geothermal well 85. Additional evaporation devices can be run in parallel and in series configuration based on the needs of the operators.

Figure 8:
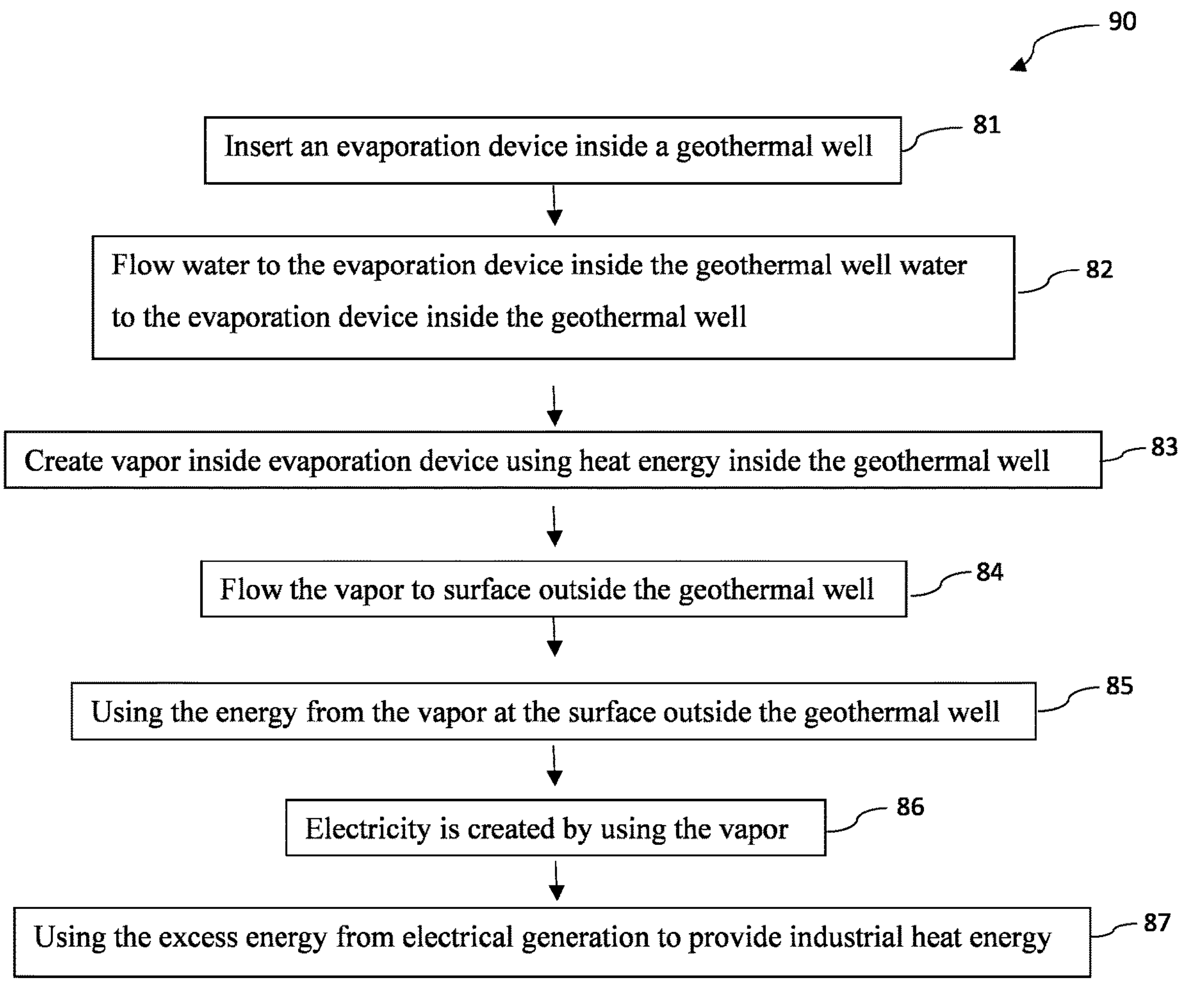
FIG. 8 is a more detailed flow chart of a method embodiment.

As shown in FIG. 8, In one embodiment, the method involves 7 steps 90. Similar or like steps in FIG. 8 are given the same numerals as the items from FIG. 7. First, an evaporation device is obtained and then inserted inside a geothermal well 81. Second, water flows to the evaporation device inside the geothermal well 82. As discussed above, the water can be pumped from the surface or can come from the geothermal well. Third, vapor inside the evaporation device is created using heat energy from the geothermal well 83. Fourth, the vapor flows to the surface outside the geothermal well 84. Alternatively, the vapor can flow to an energy device downhole or inside the wellbore. Fifth, the vapor is used at the surface outside the geothermal well 85. Sixth, vapor is used to create electricity 86. Seventh, the excess heat from the electrical generation is used to power natural processes 87.

Figure 9:
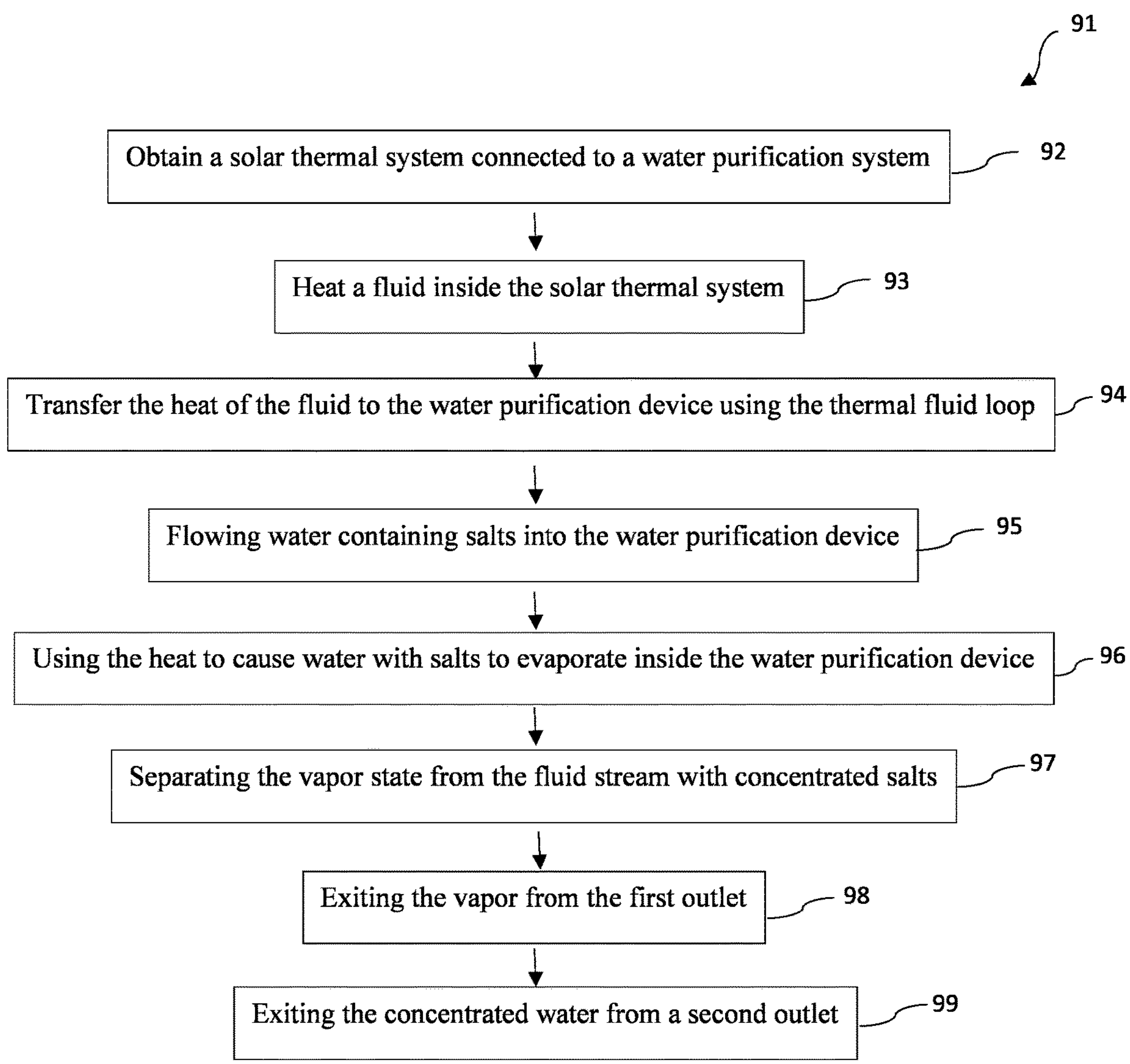
FIG. 9 is a flow chart of a solar thermal method.

Solar thermal energy can be used to desalinate water. A solar thermal embodiment to desalinate water can comprise seven steps in one embodiment. As shown in flow chart 91 in FIG. 9, the first step 92 is to obtain a solar thermal system connected with a thermal fluid loop to a water purification system, wherein the water purification system comprises at least one fluid inlet connected to a first outlet and a second outlet. The second step 93 is to heat a fluid inside the solar thermal system 92. The third step 94 is to transfer the heat of the fluid to the water purification device using the thermal fluid loop. The fourth step 95 comprises flowing water containing salts into the water purification device. The fifth step 96 comprises using the heat to cause a portion of water comprising salts inside the water purification device to form a vapor state and a fluid stream with concentrated salts. The sixth step 97 comprises separating the vapor state from the fluid stream with concentrated salts. The seventh step 98 comprises exiting the vapor from the first outlet. The eighth step 99 comprises exiting the concentrated water from a second outlet 98.

Figure 10:
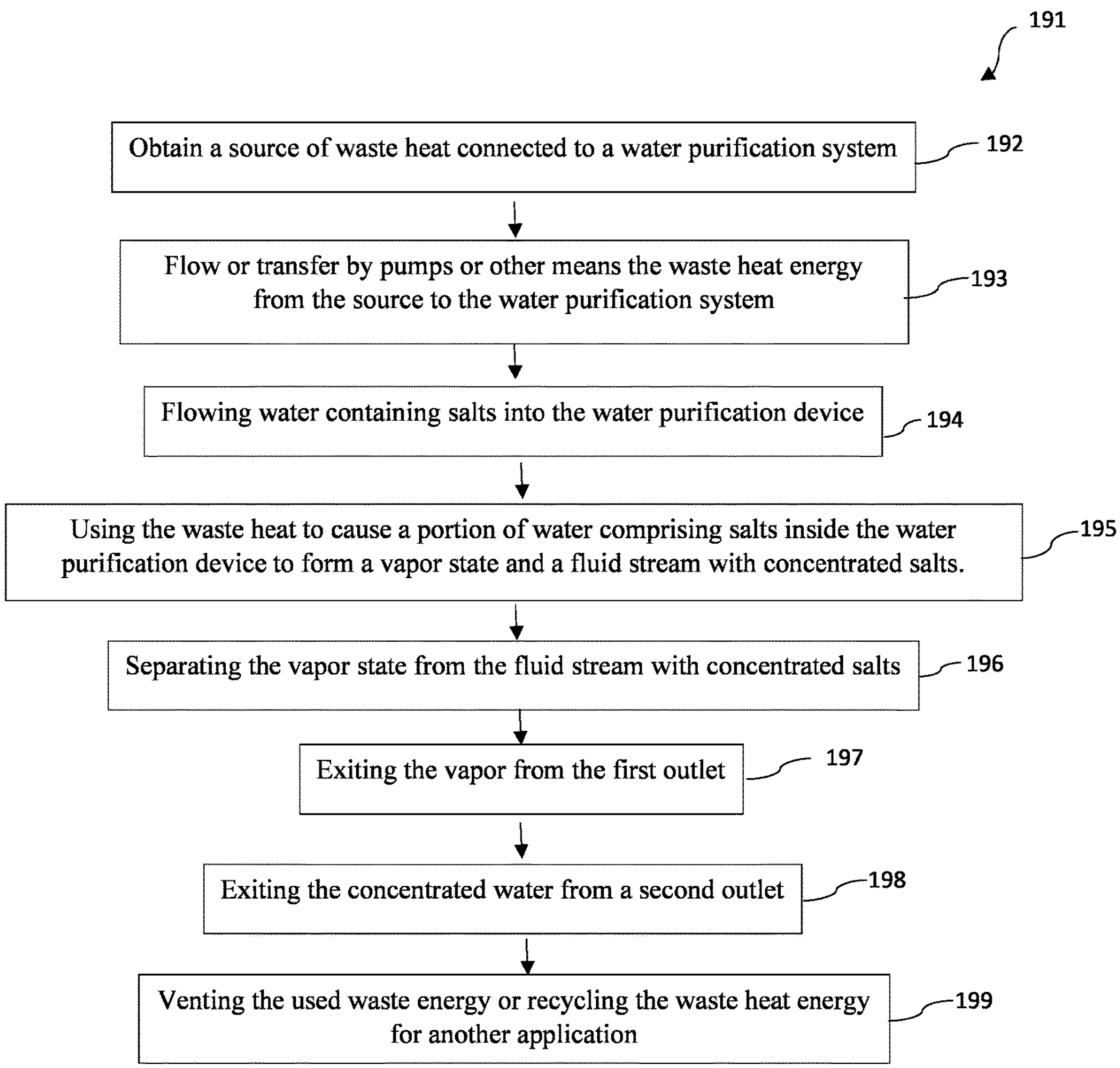
FIG. 10 is a flow chart of the waste heat energy recovery method.

Water thermal or heat energy can be used to desalinate water. A waste heat or waste thermal energy embodiment to desalinate water can comprise seven steps in one embodiment. As shown in flow chart 191 in FIG. 10, the first step 192 is to obtain a source of waste heat connected to a water purification system, wherein the water purification system comprises at least one fluid inlet connected to a first outlet and a second outlet. The connection can be closed or opened with the used heat either recycled or vented. The second step 193 is to flow or transfer by pumps or other means the waste heat energy from the source to the water purification system 192. The third step 194 comprises flowing water containing salts into the water purification device. The fourth step 195 comprises using the waste heat to cause a portion of water comprising salts inside the water purification device to form a vapor state and a fluid stream with concentrated salts. The fifth step 196 comprises separating the vapor state from the fluid stream with concentrated salts. The sixth step 197 comprises exiting the vapor from the first outlet. The seventh step 198 comprises exiting the concentrated water from a second outlet 98. The eighth step 199 comprises venting the used waste energy or recycling the waste heat energy for another application. The waste heat energy can be a single fluid or multiple fluids including gases and liquids in many different states.

System:

An evaporation system can be utilized with the invention, as disclosed. The evaporation system uses temperature sensors on the evaporator in coordination with the gas supply or heat supply and fluid flow to control the water evaporation process in a coordinated manner using a control system. Suitable control systems are disclosed in U.S. Pat. No. 11,034,605, entitled "AN APPARATUS SYSTEM AND METHOD TO EXTRACT MINERALS AND METALS FROM WATER." U.S. Pat. No. 11,034,065 is hereby incorporated by reference in its entirety. In one embodiment, at least one sensor for determining the salt concentration of the unevaporated brine; and a control system for controlling the fluid into the system based on at least one sensor for determining the salt concentration of the unevaporated brine to control the density of the brine. Other sensors can include at least one temperature sensor, fluid flow sensor, pressure sensor, water quality testing sensor, and combinations thereof.

In one embodiment, the control system can run the entire apparatus at a remote site including a hydrocarbon-producing well site or a geothermal site. With the control system, it is possible to conduct all the method steps completely remotely with an operator offsite or be operated by a computer using artificial intelligence and/or machine learning. A system using artificial intelligence and/or machine learning would improve over time and could be more efficient and cost-effective than manual or human-operated devices.

In one embodiment, the entire thermal desalination system and all the controls and hookups can be fit inside a trailer or shipping container. This system would enable quick deployment by a truck and can be quickly hooked up to a site with minimum construction or materials and can be quickly removed and deployed at another site.

EXAMPLE

A hypothetical example is provided. A small-scale modular geothermal system capable of simultaneously purifying wastewater to fresh-water quality and generating electricity using geothermal energy is built. Once the system is built and tested, it is sent to field tested to be installed in a geothermal well. The geothermal well can be a specific well drilled for geothermal energy or an oil and gas well that is being repurposed for geothermal energy. The system is designed to improve local grid resiliency with the ability to generate baseload electricity 24 hours, seven days a week while purifying wastewater to fresh-water quality for reuse. This system will also have military applications by improving base logistics by allowing off-grid electricity to be generated while reducing the demand for fresh water. This will also reduce the amount of energy, capital costs, and labor to treat wastewater at remote locations. A similar system can be useful for remote rural areas or humanitarian missions to regions without power and safe drinking water.

Once the geothermal wells are drilled, or existing oil and gas wells are repurposed as geothermal wells, and the equipment is installed, the system will have the ability to provide a continuous non-intermittent supply of electricity. The system can also supply clean water without the need for off-site energy. Other forms of alternative energy, including wind and solar, cannot provide continuous and non-intermittent electrical generation and water purification. Therefore, this system can be combined with traditional solar, wind, and hydroelectrical power to provide additional alternative energy benefits.

The geothermal system is installed by lowering the geothermal device into the wellbore to the geothermal zone of high heat energy and preferably high permeability and flow rates. The device and system can be lowered into the wellbore using a traditional wireline truck for installing wellbore equipment and tools including geophysical logging equipment. In one embodiment the wireline is removable from the truck to allow the system to be permanently supported by one or more lines or wirelines in the wellbore without the need for the truck to remain onsite. Alternatively, the system can be anchored to the well by a removable extension to the device that securely holds the device at the chosen depth interval.

The removable extension or arms would latch onto the wall of the well to support the device. The wireline truck can then remove the device and system for routine maintenance or removal to be sent to another well site or to be replaced and/or decommissioned. Alternatively, a winch system can install and remove the device and system by lowering and raising the device and system in the wellbore.

The final depth of the device can be determined by the geothermal temperature curve of the well or subterranean formation. Other factors in choosing the depth include permeability, the diameter of the wellbore at depth, and the flow rates of the formation. The more permeable sections of the subsurface allow more fluid flow, the more heat energy can be extracted even if wastewater is being injected into the well. Smaller geothermal devices may need to be designed built and as the deeper wellbores have diameters less than 12 inches. Accordingly, the entire geothermal device should preferably be less than 12 inches in diameter, even more preferably less than 10 inches in diameter, and most preferably less than 8 inches in diameter.

Another embodiment for determining the preferred depth of the geothermal desalination device is to have an attached temperature sensor or thermocouple on the device and install the device at the highest known temperature. The attached thermocouple will be useful for understanding the operating conditions of the geothermal well based on the surrounding temperature which can allow the user or artificial intelligence running the system to choose favorable flow rates in the geothermal system.

To produce electricity, a small generator will be attached using the steam produced by the X-VAP Water is then pumped into the geothermal system from the surface. Alternatively, water could be pumped from the formation into the geothermal device. The heat exchanger transfer heat from the geothermal subsurface region to the water being pumped causing a portion to become steam or vapor. to generate electricity. The vapor is then flowed or pumped to the surface for use as fresh water. Alternatively, the vapor can be brought to the surface to run a turbine or be used for industrial heat purposes such as, to provide energy to run greenhouses or agricultural processing including pasteurization.

The remaining water that is not converted into steam is then discharged into the wellbore to be carried away into the subsurface formation. This embodiment allows for the discharging of wastewater downhole into the subsurface formation, while producing fresh water and electricity on the surface. Accordingly, this device would have multiple revenue streams. The multiple revenue streams include wastewater disposal, freshwater sales, electricity production, and any green credit including carbon reduction credits and water credits.

Another potential revenue stream is the selective removal of valuable metals often called critical material(s) or CM(s). In this embodiment, the water purification can be done on the surface to allow metal separation or the rejected brine created in situ or in the geothermal formation can be brought to the surface for further processing. Geothermal brines or formation water has been shown to contain valuable CM including lithium, nickel, cobalt, and rare earth elements. U.S. Provisional Patent No. 63/423,458 entitled, "DEVICES, SYSTEMS, AND METHODS TO FACILITATE CRITICAL METAL EXTRACTION FROM WATER" filed on Nov. 7, 2022, discloses devices and methods to remove valuable metals. U.S. Provisional Patent No. 63/423,258 is hereby incorporated by reference in its entirety. These metals include but are not limited to lithium, nickel, magnesium, manganese, cobalt, and rare earth metals. This removal process could provide a valuable additional revenue source. Finally, the brine can often be concentrated into a heavy brine which has some industrial uses, including road salts, drilling muds, and completion fluids for oil and gas operations. This example of a geothermal system is only a hypothetical example and is not meant to be limiting in any manner.

What is claimed is:

1. An apparatus comprising:

a. a solar thermal apparatus, the solar thermal apparatus uses solar energy to heat a thermal fluid;

b. an apparatus to purify water; wherein the apparatus requires heat energy; and c. a closed thermal loop connecting the solar thermal apparatus to the apparatus to purify water, wherein, the thermal fluid provides heat to the apparatus to heat water and create a vapor state inside the apparatus which separates from concentrated water containing salts;

wherein:

the apparatus to purify water is a heat exchanger comprising at least one inlet and at least two outlets, wherein the heat exchanger distills saltwater and separates purified vapor from a concentrated water stream inside the heat exchanger and at least a portion of the purified vapor exits a first outlet and at least a portion of the concentrated water exits a second outlet of the heat exchanger; and the heat exchanger comprises an inner annulus and an outer annulus, the inner annulus configured to receive the water and the outer annulus configured to receive the heated thermal fluid.

2. The apparatus of claim 1, further comprising a condensation system for condensing the purified vapor after it exits the apparatus to purify water.

3. The apparatus of claim 2, wherein the condensation system comprises a plate heat exchanger.

4. The apparatus of claim 2, wherein the condensation system comprises a shell-and-tube heat exchanger.

5. The apparatus of claim 1, further comprising a venturi, wherein the venturi is used to pull a vacuum inside the heat exchanger.

6. The apparatus of claim 5, the venturi is connected to the second outlet and creates a vacuum inside the heat exchanger sufficient to reduce pressure below 0.9 bar.

7. The apparatus of claim 1, further comprising at least one temperature sensor positioned proximate to the inlet of the heat exchanger.

8. The apparatus of claim 1, further comprising at least one temperature sensor is positioned proximate to the first outlet of the water purification apparatus heat exchanger.

9. The apparatus of claim 1, wherein the solar thermal apparatus comprises a plurality of linear Fresnel parabolic panel reflectors.

10. The apparatus of claim 1, wherein the solar thermal apparatus comprises a parabolic dish concentrator.

11. The apparatus of claim 2, wherein the heat exchanger comprises a finned tube heat exchanger.

12. A method comprising:

a. obtaining an apparatus comprising:

i. a solar thermal apparatus, the solar thermal apparatus uses solar energy to heat a thermal fluid;

ii. an apparatus to purify water; wherein the apparatus requires heat energy; and iii. a closed thermal loop connecting the solar thermal apparatus to the apparatus to purify water, wherein, the thermal fluid provides heat to the apparatus to heat water and create a vapor state inside the apparatus which separates from concentrated water containing salts;

wherein:

the apparatus to purify water is a heat exchanger comprising at least one inlet and at least two outlets, wherein the heat exchanger distills saltwater and separates purified vapor from a concentrated water stream inside the heat exchanger and at least a portion of the purified vapor exits a first outlet and at least a portion of the concentrated water exits a second outlet of the heat exchanger; and the heat exchanger comprises an inner annulus and an outer annulus, the inner annulus configured to receive water and the outer annulus configured to receive the heated thermal fluid;

b. flowing water to the apparatus to purify water;

c. flowing the thermal fluid through the closed thermal loop connecting the solar thermal apparatus to the apparatus to purify water; and d. exiting purified vapor from the first outlet.

* * * * *